WILBUR R. LEOPOLD
ELTON L. TOWLE
INVENTORS

WILBUR R. LEOPOLD
ELTON L. TOWLE
INVENTORS

Aug. 30, 1960  W. R. LEOPOLD ET AL  2,950,683
FLOW CONTROL MEANS FOR A PUMPING STATION
Filed Jan. 29, 1958  4 Sheets-Sheet 4

WILBUR R. LEOPOLD
ELTON L. TOWLE
INVENTORS

BY Daniel H. Bobb
ATTY

United States Patent Office
2,950,683
Patented Aug. 30, 1960

2,950,683

FLOW CONTROL MEANS FOR A PUMPING STATION

Wilbur R. Leopold, Upper Montclair, and Elton L. Towle, Glen Rock, N.J., assignors to Worthington Corporation, Harrison, N.J., a corporation of Delaware Filed Jan. 29, 1958, Ser. No. 711,919

10 Claims. (Cl. 103—11)

This invention relates to a pumping station and more particularly to a flow control means of the type shown in United States Patent 2,733,660, granted to Elton L. Towle et al. on February 7, 1956.

The control means of the foregoing patent is particularly effective in providing a station, having nominal variable flow thereto, with the greatest possible power savings.

This is accomplished, as is more fully described in the above-mentioned patent, with the provision of means whereby the capacity of a pump or a series of pumps may be varied in accordance with the flow into the station. Said another way, the foregoing control eliminates the impractical, expensive and costly operation of a station which results from the operation of all the pumps in such a system or the operation of one or more of them at maximum speed and capacity when the flow to said station does not require such pumping capacity.

In other installations, particularly those wherein storm waters are frequently handled, further power savings may be obtained as is described in Patent 2,791,179 by raising or lowering the reference level in the suction reservoir as successive units come into or are taken out of operation. Specifically, the added suction head is utilized to compensate for the increase in discharge head resulting from the increased flow in the discharge conduits of the station. This is accomplished by raising the reference level to a maximum position in the suction reservoir as the last pump is actuated into operation.

However, it has been found that where flooding of the inlet conduits to the suction reservoir is to be prevented, under heavy load conditions, that it is desirable to lower the suction reservoir level to a minimum point. In effect, the lowering of the level in the suction reservoir eliminates the arresting effect that the higher level has, as is the case in Patent 2,791,179, on the water or the like flowing to said suction reservoir from the outlying inlet conduits.

In addition, and in order to provide this installation with the greatest possible power savings, it is contemplated that, and particularly during normal operation thereof, the optimum suction reservoir level be selected as a reference level for the control means. In other words, it is intended that the system operate with the minimum permissible static head during its normal operation.

The present invention meets this problem by providing a pumping system which is automatically controlled to allow the reference level of the suction reservoir to remain either substantially constant to be graduated upward or downward as desired or dictated by local requirements by nullifying the action of the indicator means associated with the flow control means so that when the flow to the system is great or small the reference level in the suction reservoir is varied to permit a retention in the system of the nearly constant hydraulic head and in addition preclude the flooding of areas bounding on the inlet conduits.

It is an object of the present invention to provide a flow control with means associated therewith whereby the reference level in the suction reservoir, acting to control the flow capacities of the pumps, may be adjusted to any predetermined level within the practical bounds of said suction reservoir.

It is a further object of this invention to provide indicator means for the flow control that indicate both the level of the fluid and the movement of the float in the suction reservoir.

With the foregoing objectives in view, and others as may appear from the accompanying specification, the invention consists of various features of construction and combination of parts, which will be first described in connection with the accompanying drawings, showing a pumping station provided with the improved flow control, and the features forming the invention will be specifically pointed out in the claims.

In the drawings:

Figure 4 is a fragmentary view partly in section and partly in elevation of the flow control means and taken approximately on line 4—4 of Figure 3.

Figure 5 is a detail horizontal section through the flow control means taken on line 5—5 of Figure 3.

Figure 6 is a detail section taken on line 6—6 of Figure 3.

Figure 1:
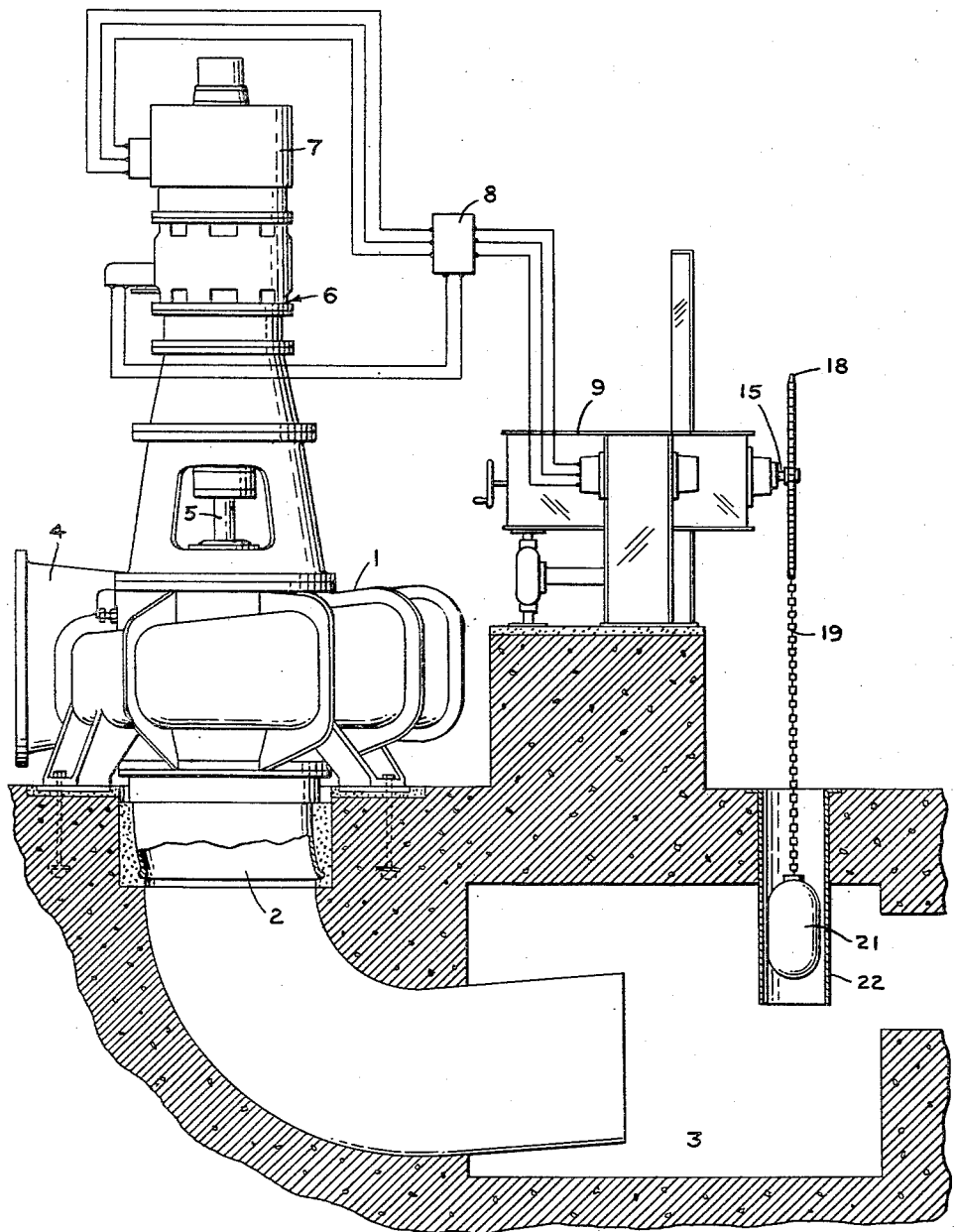
Figure 1 is a diagrammatic view of a pumping unit showing the present invention embodied therein.

Referring more particularly to the drawings, Figure 1 thereof illustrates a pumping system embodying the present invention, wherein the pump 1, which may be of any approved type of centrifugal pump applicable for use in the pumping conditions to be met, has its suction connected to a source of liquid to be pumped (not shown), in the present instance through a reservoir 3. The pump 1 discharges through its discharge outlet 4 to any suitable point of discharge. The driving shaft 5 of the pump 1 is connected to a magnetic drive or speed regulating means 6 which is in turn driven by an electric motor 7.

The pumping system herein illustrated employs an electrical control 8 in connection with the magnetic drive 6, of the character illustrated in Patent 2,733,660, to provide adjustable, pre-selected speed of the shaft 5, and consequently of the pump 1. A liquid level operated flow control means 9 (generally shown in Figure 1 and specifically shown in Figures 2 to 7) in association with the electrical control 8 will provide control of the speed operation of the pump 1 in substantially stepless speed variations, the steps in speed variation being so small as to be unnoticeable.

The magnetic drive and electrical control hereinabove referred to are well known in the art and purchaseable on the open market. Accordingly, it is to be understood that other applicable variable speed torque transmitters or other applicable electrical controller than that shown herein and referred to above may be employed without departing from the spirit of the invention.

Figure 2:
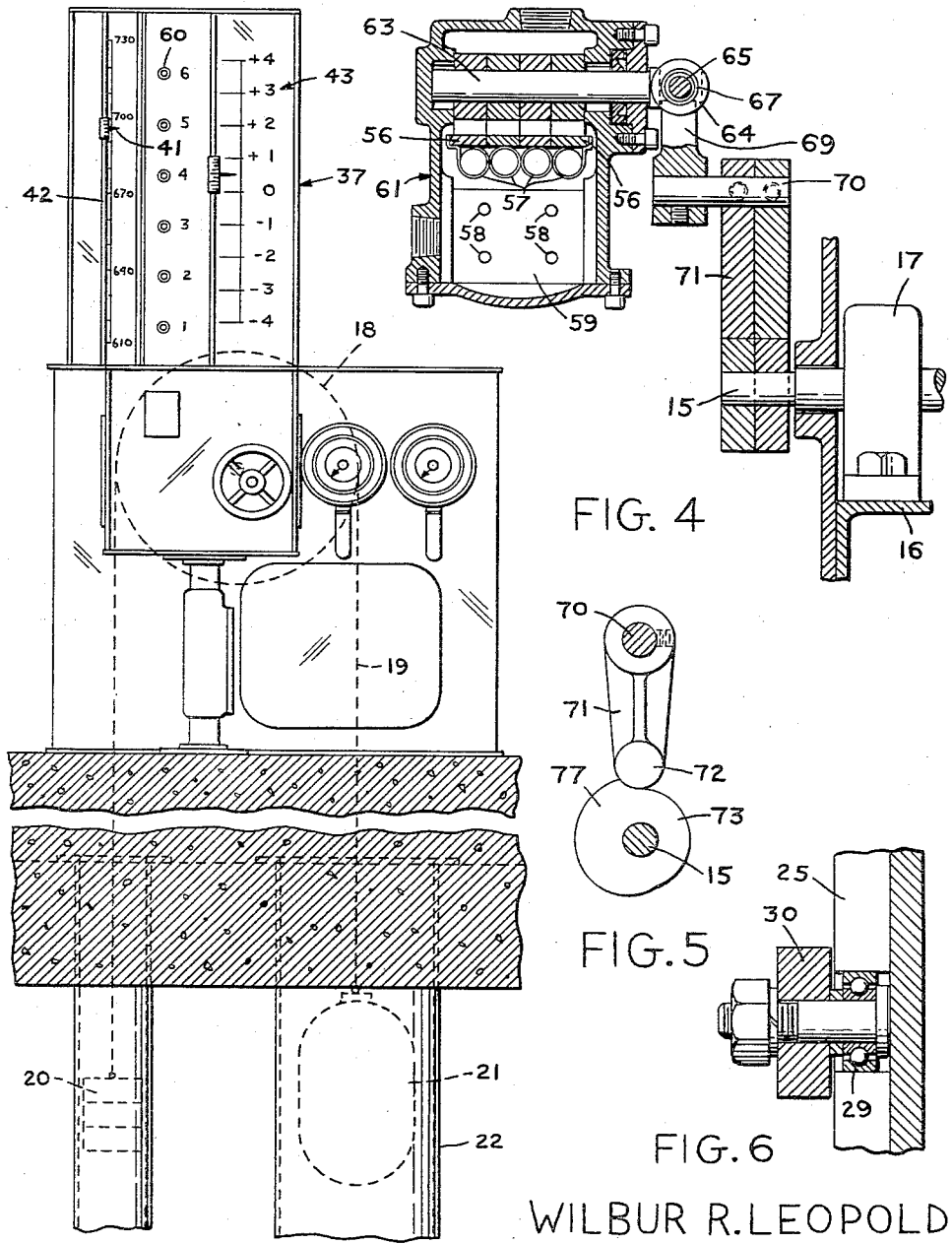
Figure 2 is a side elevation of the flow control means.
Figure 3:
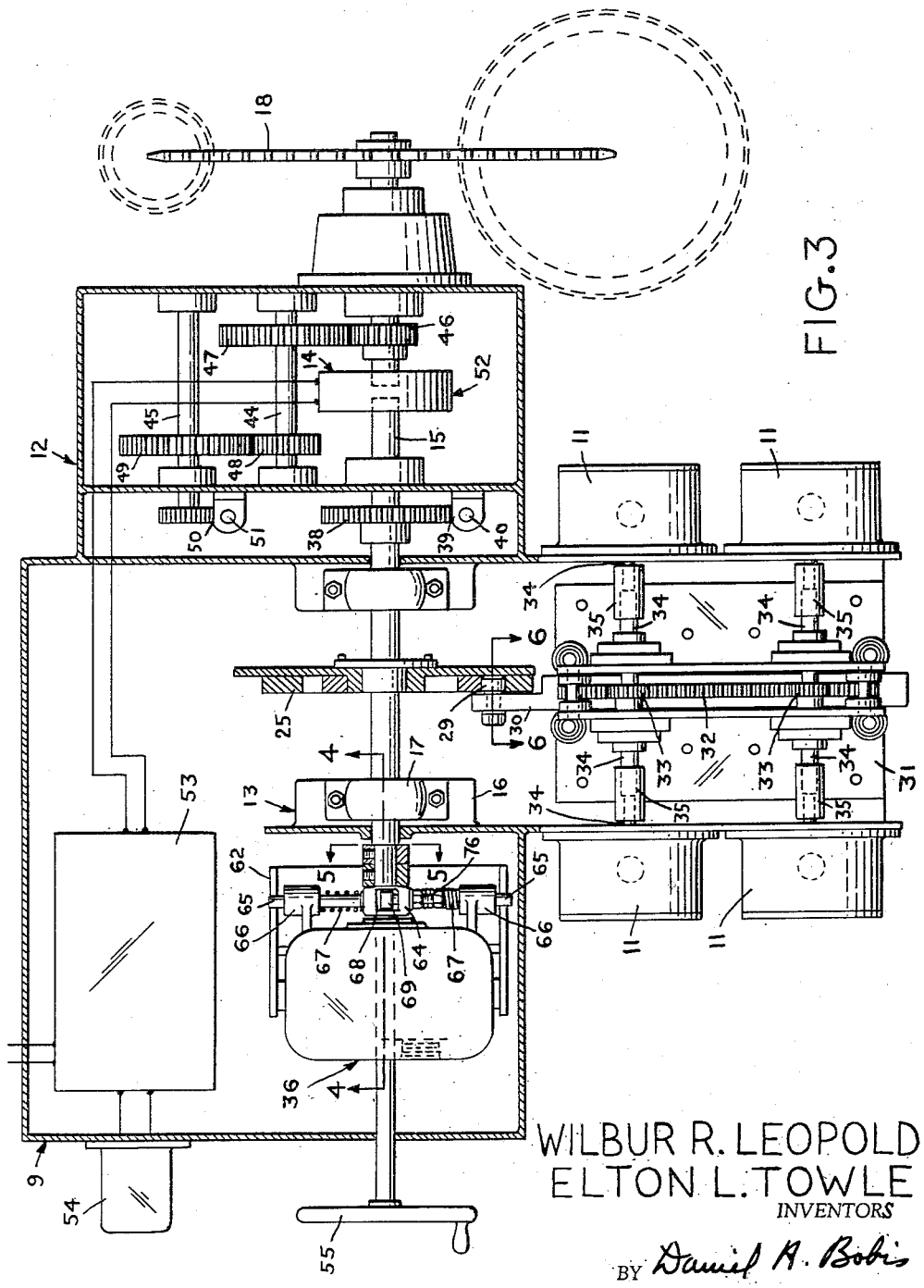
Figure 3 is a top view partly in section and partly in plan of the flow control means.
Figure 7:
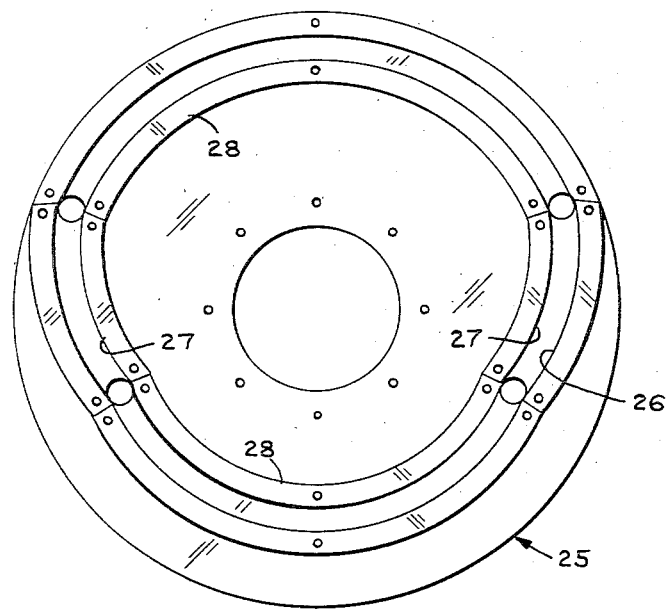
Figure 7 is a plan view of the control or operating cam employed in the flow control means.
Figure 8:
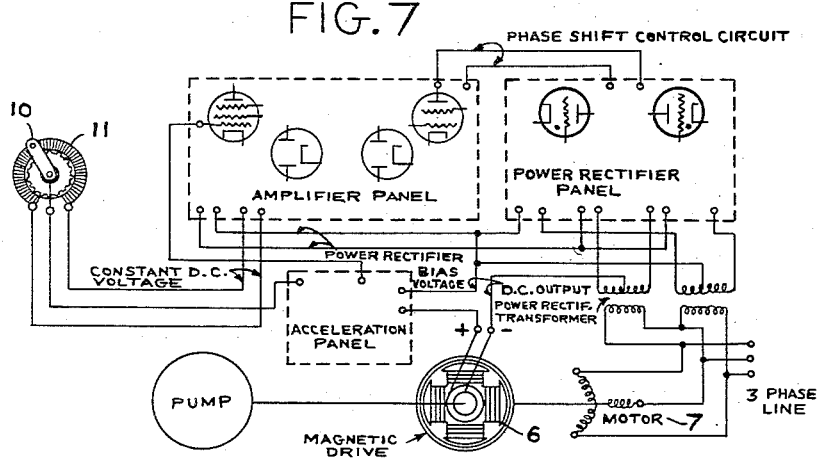
Figure 8 is a diagrammatic representation of one type of electronic controller for controlling operation of the "magnetic drive."

The fluid level variance operated flow control means 9 shown in Figure 3 which operates or moves the arm 10 (Figure 8) of variable resistance means 11 such as a potentiometer rheostat which adjusts the speed of operation of the pump 1 through the magnetic drive 6 as above described is shown in detail in Figures 2 to 7 inclusive of the drawings.

The flow control means 9 comprises indicator means generally designated 12 for measuring the level in suction reservoir 3, control means 13, connected to the indicator means as hereinafter described, to signal the speed regulating means of magnetic drive 6 through the electrical controller 8 to vary the output of the pump 1 by varying the power flow from the motor 7 to the shaft 5.

To provide a pumping station wherein the reference level for the indicator means may be varied according to the demands for the station, flow control means 9 is provided with novel detachable means 14 which are normally operatively connected between the control means 13 and indicator means 12 to nullify the signal of reservoir level sent from the indicator means 12 to the control means 13 as is hereinafter described.

More specifically the indicator means 12 of the flow control 9 includes a shaft 15 supported from suitable pedestals 16 by bearings 17. A sprocket wheel or rotary element 18 is keyed on the shaft 15 and includes means for imparting rotation thereto such as a chain 19 as is clearly shown in Figure 1 of the drawings. The chain 19 has a counterweight 20 attached to one end thereof and the other end is connected by any well known manner to a float 21 which is located in a float tube or float well 22. The bottom of or open lower end of the float tube extends into the suction reservoir 3 below the normal level of liquid therein so that variances in the level of liquid in the suction reservoir 3 will move the float 22. Movement of the float under variances of the liquid level in the suction reservoir 3 will, through the sprocket chain 19, rotate the sprocket 18 and shaft 15.

To convey variances of the fluid level in the suction reservoir to the speed control means 6 flow control means 9 includes control means 13 operatively connected to the shaft 15 of the indicator means 12.

The action of the indicator means 12 is transmitted to the control means 13 through a cam or rack keyed to the shaft 15 of the indicator means 12. The cam has a cam groove or cam track 26 in one face thereof which has eccentric variable speed sectors 27 and concentric constant speed sectors 28 at each end of the eccentric variable speed sectors 27 as is clearly shown in Figure 7 of the drawings.

A cam roller 29, which preferably is of a roller or ball bearing structure as shown in Figures 3 and 6 engages in the cam track 26. The cam roller 29 is attached to one end of a rack bar 30 which is slidably carried by a suitable support 31, and is preferably ball bearing mounted.

A rack 32 is carried by the rack bar 30, moves therewith, and meshes with pinions 33 carried by shafts 34. The shafts 34 are rotatably supported by the support 31 and are connected by suitable couplings 35 to the arm operating pins or shafts 34 of the variable resistance means 11 four of which are shown as potentiometer rheostats in the drawings.

While four variable resistance means are shown in the drawings for regulating the excitation to four respective speed regulating means and thusly control the speed of four different pumps, it is to be understood that any number of such variable resistance means may be employed in connection with the flow control means 9 depending on the number of pumps or pumping units employed in the system with which the flow control means are used.

As was hereinbefore stated detachable means 14 are mounted between the indicator means 12 and the control means 13 so that upon disconnection thereof the float 21 becomes a free agent. Said another way, the float follows, without affecting the pumping rate, the liquid level in the suction reservoir. It is evident then that with the provision of adjusting means 36 in operative connection with the cam 25 of the control means 13 it is possible after detaching the detachable means 14 to set the reference level to any predetermined level within the bounds of the float tube 22. This is accomplished by manipulating the potentiometers 11 and individual pump switches as hereinafter described through the rack 32 cam 25 and adjusting means 36, to either speed up or speed down the speed regulating means asociated with the pumps of the station and through the individual pump switches to add or diminish the number of pumps operating in the station.

To permit accurate locating of a new reference level, and to record other desired conditions in the reservoir level; indicator means 12 is provided with an indicator board 37. More particularly and in order to record the liquid level in the suction reservoir, the indicator means 12 is provided with shafts 44 and 45, shaft 44 receiving power from shaft 15 through gears 46 and 47 keyed respectively to each of the said shafts and transmits said power to shaft 45 through the gears 48 and 49.

In order to convert this power to a readable figure shaft 45 is operatively connected to a rack 50 which is mounted on a movable rod 51, which rod is provided with a pointer 41 which records the liquid level on gauge 42 provided on the indicator board 37.

In some cases it is desirable to provide a second gauge which may record any desired condition in the reservoir level. The gauge 43 in Figure 2 of the drawings is adapted to indicate the movement of the float from the pre-selected reference level. To accomplish this foregoing objective indicator means 12 is provided with a shaft 15 which includes a gear 38 that is in power transmitting association with a rack 39 connected to a movable rod 40 which is mounted in any convenient manner in the indicator board 37.

Reference was made hereinbefore to the detachable means 14 which is operatively connected between the indicator means 12 and control means 13. With this provision of detachable means 14 and adjusting means 36 the pumping station may be adjusted to operate at any predetermined reference level to thereby preclude the possible flooding of areas bounding the brooks and conduits feeding the station and at the same time provide a station with the most efficient type operation.

The detachable means preferably comprises a magnetic clutch 52 which is mounted on the shaft 15 in any well known manner so that power will be transmitted from the sprocket 18 to the shaft 15 through the clutch 52 to the control means 13 when current is supplied to the clutch 52 from the rectifier 53 which is mounted in the control means in any suitable manner.

In order to disengage the clutch 52 switch means 54 connected to the rectifier 53 is actuated to stop the current flow to the electric clutch 52. Accordingly, the action of the indicator means 12 on the control means 13 is nullified and the float 21 becomes a free agent following the liquid level in the suction reservoir 3. The liquid level is adjusted up or down by manipulating a handwheel 55 of the adjusting means 36 as was hereinbefore described. As soon as the gauge 42 on the indicator board 37 indicates that the liquid level is at the desired reference level the switch 54 is actuated to cause the rectifier 53 to excite the electric clutch 52 into the operation and the control is now operative in similar fashion as that described in Patent 2,733,660.

Normal operation of the flow control is as follows:

The float rises and falls with variances in the liquid level in the reservoir 3. The rise and fall of the float moves the chain 19 which rotates the sprocket 18 which in turn rotates the cam 25. When the cam roller 29 is engaged in an eccentric portion of the cam track 26 rotation of the cam will move the rack bar 30, and through the rack 32 and pinions 33 will adjust the arms 10 of the respective rheostats 11 to control or vary the speed of operation of the pumps associated with the said rheostats in accordance with the variations of the liquid level in the reservoir 3, through excitation of the speed control means as is more fully described in Patent 2,733,660.

When the cam roller 29 passes from an eccentric portion of the cam track 26 into a concentric portion of the track no motion is transmitted to the rheostat arms 10 and thus when the rheostat arms 10 are in minimum or maximum position, float movement is permitted without affecting the speed of the pump. And the float may continue following the liquid level up or down, respectively, without altering the speed of rotation of the pump or pumps but additional pumps may be either turned on or off in these so-called overtravel or undertravel positions.

The potentiometer rheostats 11 may be set in any desired manner, within their limits of setting, to control the speeds of the various pumps in the system in any sequence, desired or necessary to provide the proper operation of the pumping system.

By removing the excitation on the magnetic drive 6 of the pumping unit the pump may be stopped, allowing the motor 7 to continue to run. Restoration of the excitation on the magnetic drive will restart the pump. The pumps of a multi-pump unit station may, therefore, be started and stopped, without having to start and stop the respective motors, under control of the indicator means 12 through the control means 13 and speed regulating means 7, to cut in and out the respective pumping units as the quantity of liquid to be pumped dictates, and such pump or pumps as are in operation will have their speed regulated in stepless speed increments over the entire variable speed range, also as variances in the level of liquid to be pumped dictates.

One or more adjustable mercury switches are associated with the control means 13 and are operated in the manner hereinafter described, by rotation of the shaft 15. Such switch or switches establish or break circuits which may be used for purposes of indicating by alarms or lights located as is shown in Figure 2 on the indicator board 37 an extreme high or low level, the pumping units operating at a particular instant; or to excite the starting mechanism of these units automatically, or to stop such units. Where the pumping units are all of magnetic drive type such circuits may operate the excitation of the magnetic drives permitting stopping of pumps on extreme low level without stopping the motors. Where some of their units may be of constant speed types, these circuits may be employed for the automatic start or stop of such units at the same time retaining in service the variable speed magnetic drive unit with each combination.

The stepless output cycle of one or more units employing at least one variable speed unit, may be accomplished even though some units are fixed speed type through progressive settings of these switches in the under or over travel zones of the cam 25 movement. Any approved type of alarm or signal, and/or any approved type of cutoff switch mechanism may be employed in connection with the mercury switch or switches, and therefore such devices are not shown or described herein.

The mercury switch structures and their operating mechanism may be of any approved form, one such form is shown in detail in Figures 4 and 5 of the drawings and include rockable switch-supporting platforms or shoes 56 which have mercury switches 57 of ordinary construction, mounted thereon. The mercury switches 57 are electrically connected to terminals 58 carried by a panelboard 59. The electrical circuits go from terminal 59 to any suitable alarm or signal mechanism 60 on the indicator board or to any suitable switch (not shown) as desired and as above referred to.

The switches 57 and the panel board 59 are enclosed in a suitable housing 61 which is supported on the support 62.

A rocker shaft 63 is rockably carried by the housing 61 and has the shoes 56 mounted thereon for movement with the rocker shaft 63 to operate the switches 57.

The rocker shaft 63 has a yoke 64 thereon to the opposite ends of which are attached guide rods 65. The guide rods 65 are slidably mounted in brackets 66 rigidly supported from the housing 61. Springs 67 are mounted on the guide rods 65 between the yoke 64 and the guide bracket 66 and are tensioned to maintain the yoke 64 centrally in straight position between the brackets 66 and to maintain the shoes or platforms 56 in horizontal position.

The yoke 64 has an opening 68 extending therethrough into which an operating finger 69 extends. The operating finger 69 is carried by a stud 70 which in turn is carried by a cam arm 71. Each of the cam arms 71 has a cam engaging head 72 on its end opposite to the end carrying the stud 70. The cam engaging head 72 engages the perimeter of operative cams 73 and 74 mounted on the shaft 15. The cams 73 and 74 are held in adjusted position on the shaft 15 by set screws 75.

One or more adjustable studs 76 are carried by the yoke 64 for contact with the operating finger 69, and may be adjusted to regulate the degree of lost motion of the operating finger 69, before it starts to move yoke 64 and rock the shaft 63.

During rotation of the shaft 15 and when the cam head 72 engages the hump or rise 77 of the perimeter of the cam 73, it will move the cam arm 71 in one direction, moving the operating finger 69, which through contact with the stud 70 or the yoke 64 will cause limited movement of the yoke, resulting in rocking movement of the rocker shaft 63 with the resultant movement of the mercury switches 57. When the cam head 72 engages the hump or rise of the cam 73 the operating finger will be moved in the opposite direction resulting in a reversed operation of the rocker shaft 63 and mercury switches 57.

While the cam head 72 is riding over the normal surface of the perimeters of the cams 73 and 74 the operating finger will be in central upright position and the springs 67 will hold the yoke 64 and rocker shaft 63 and mercury switches in normal positions to cut off flow of electric current through the switches.

While the control method and apparatus is shown in the drawings as applied to a vertical shaft pumping unit, it is equally adaptable to a horizontal shaft pumping unit, and in systems employing a plurality of pumps the programming of speed control may be arranged so that with increasing liquid levels in the reservoir succeeding pumps will be started and/or speed of the operating pumps increased in any desired sequence, and the sequence of starting and stopping of the pumps may be arranged in different order if desired.

The starting or speed chamber of the pump or pumps may be arranged to become effective at various liquid levels in the reservoir 3 or at different degrees of variance in the liquid level. All such changes or settings of the apparatus are possible through the manipulation of the adjusting means 36, detachable means 14, control means 13 and the various other setting adjustments provided for as hereinbefore described.

It will be understood that the invention is not to be limited to the specific construction or arrangement of parts shown, but that they may be widely modified within the invention defined by the claims.

What is claimed is:

1. Variable flow control means for use with a pumping system having a suction reservoir, said system including a pump, driving means for said pump and speed regulating means operatively interconnecting said pump to said driving means for varying the power flow from said driving means to said pump, said variable flow control means including indicator means for measuring the level in said suction reservoir, control means operatively interconnecting said indicator means to said speed regulating means and to signal said speed regulating means to vary the pump output when the level in said reservoir varies from a preselected level, adjusting means operatively connected to said control means for regulating the pump output, detachable means normally operatively interconecting said indicator and control means, and switch means connected to said detachable means for disconnecting said control means from said indicator means through said detachable means whereby the references level in said reservoir may be varied according to the demands of said system.

2. Variable flow control means for use with a pumping system having a suction reservoir, said system including a pump, driving means for said pump and speed regulating means operatively interconnecting said pump to said driving means for varying the power flow from said driving means to said pump, said variable flow control means including indicator means for measuring the level in said suction reservoir, control means including a cam operatively interconnecting said indicator means to said speed regulating means, said cam having a track portion for signaling said speed regulating means to vary the pump output when the level in said reservoir varies from a predetermined level, over and under travel portions for said cam for nullifying the signal from said indicator means during other predetermined levels, adjusting means operatively connected to said control means for regulating the pump output, detachable means normally operatively interconnecting said indicator and control means, and switch means connected to said detachable means for disconnecting said control means from said indicator means through said detachable means whereby the reference level in said reservoir may be varied according to the demands of said system.

3. In the device claimed in claim 2 wherein the detachable means comprises a magnetic clutch.

4. In the device claimed in claim 2 wherein the indicator means includes, a rotary element operatively connected to said cam, a float movable by variances in the reservoir level, means operatively interconnecting said float to said rotary element so that float movement is transmitted to said rotary element and a panel operatively interconnected between said rotary element and said cam for indicating the level in said reservoir.

5. In the device claimed in claim 2 wherein the cam includes a rack operatively connected to said cam, an electric control device for controlling excitation of said speed regulating means, actuating means connecting said rack to said electric control device for operation thereof upon movement of said rack, and said indicator means includes a rotary element, a float movable by variances in the reservoir level, means operatively interconnecting said float to said rotary element so that float movement is transmitted to said rotary element, and a panel operatively connected between said rotary element and said cam for indicating the level in said reservoir.

6. Variable flow control means for use with a pumping system having a suction reservoir, said system including a pump, constant speed driving means for said pump and speed regulating means operatively interconnecting said pump to said driving means for varying the power flow from said constant speed driving means to said pump, said variable flow control means including indicator means having a rotary element, a float movable by variances in the reservoir level, means operatively interconnecting said float to said rotary element so that float movement is transmitted to said rotary element, a panel connected to said rotary element for indicating the level in said reservoir, control means including a cam operatively interconnecting said rotary element to said speed regulating means, a mercury switch operatively connected to said cam to stop and start said pump, cams operated by said first cam for operating said mercury switch in accordance with predetermined variances of level in the reservoir, adjusting means operatively connected to said cams operated by said first cam for actuating said mercury switch independently of the level in said reservoir, detachable means normally operatively interconnecting said indicator and control means, and switch means connected to said detachable means for disconnecting said control means from said indicator means through said detachable means whereby the reference level in said reservoir may be varied according to the demands of said system.

7. Variable flow control means for use with a pumping system having a suction reservoir, said system including a plurality of pumps, constant speed driving means for each of said pumps and speed regulating means operatively interconnecting each of said driving means to its corresponding pump for varying the power flow from the driving means to the pump, said variable flow control means including indicator means for measuring the level in said suction reservoir, control means including variable resistance means interconnecting said indicator means to each of said speed regulating means and to signal said speed regulating means to vary the output of said pumps when the level in said reservoir varies from a preselected level, a cam in said control means operatively interconnecting said indicator means to said variable resistance means, said cam having a track portion for signaling said variable resistance means to cause said speed regulating means to vary the pump output, over and under travel portions for said cam for nullifying the signal from said indicator means during other predetermined levels, adjusting means operatively connected to said control means for regulating the pump output, detachable means normally operatively interconnecting said indicator and control means, and switch means connected to said detachable means for disconnecting said control means from said indicator means through said detachable means whereby the reference level in said reservoir may be varied according to the demands of said system.

8. In the device claimed in claim 7 wherein the detachable means comprises a magnetic clutch.

9. In the device claimed in claim 7 wherein the indicator means includes, a rotary element operatively connected to said cam, a float movable by variances in the reservoir level, means operatively interconnecting said float to said rotary element so that float movement is transmitted to said rotary element and a panel operatively interconnected between said rotary element and said cam for indicating the level in said reservoir.

10. In the device claimed in claim 7 wherein the cam includes a rack operatively connected to said cam, an electric control device for controlling excitation of said speed regulating means, actuating means connecting said rack to said electric control device for operation thereof upon movement of said rack, and said indicator means includes a rotary element, a float movable by variances in the reservoir level, means operatively interconnecting said float to said rotary element so that float movement is transmitted to said rotary element, and a panel operatively connected between said rotary element and said cam for indicating the level in said reservoir.

References Cited in the file of this patent

UNITED STATES PATENTS

| | | |
|---|---|---|
| 2,733,660 | Towle et al. | Feb. 7, 1956 |
| 2,791,179 | Dorer | May 7, 1957 |